United States Patent [19]

Itoh et al.

[11] Patent Number: 4,937,812
[45] Date of Patent: Jun. 26, 1990

[54] SUBSIDIARY STATION CAPABLE OF AUTOMATICALLY ADJUSTING AN INTERNAL DELAY IN RESPONSE TO A NUMBER SIGNAL RECEIVED IN A DOWNWARD SIGNAL BY THE SUBSIDIARY STATION

[75] Inventors: Norio Itoh; Masayuki Ohtawa, both of Tokyo, Japan

[73] Assignee: NEC Corporation, Japan

[21] Appl. No.: 97,858

[22] Filed: Sep. 17, 1987

[30] Foreign Application Priority Data

Sep. 17, 1986 [JP] Japan .................................. 61-218874

[51] Int. Cl.⁵ ........................... H04J 1/16; H04J 3/14; H04J 3/00; H04B 3/36
[52] U.S. Cl. ..................................... 370/13.1; 370/97; 375/3
[58] Field of Search .................. 370/97, 104, 13.1, 13; 379/4, 340, 338; 375/3; 455/15, 18, 14

[56] References Cited

U.S. PATENT DOCUMENTS

4,334,303  6/1982  Bertin et al. ........................ 370/13.1
4,611,324  9/1986  Giacometti et al. ................... 370/97
4,710,976 12/1987  Wakabayashi et al. ............. 370/13.1

Primary Examiner—Benedict V. Safourek
Assistant Examiner—Wellington Chin
Attorney, Agent, or Firm—Laff, Whitesel, Conte & Saret

[57] ABSTRACT

A repeater station receives from a preceding station a first downward signal of a frame period, with a propagation delay. The repeater transmits a second downward signal to a succeeding station, which second signal is a delayed repeat of the first downward signal. A first delay circuit in the repeater gives the first downward signal a fixed delay which is equal to an integral submultiple of the frame period minus the propagation delay and precesses the second downward signal to include the fixed delay. The first downward signal includes a reference signal and a number signal which is representative of the repeater station. A first detector detects the reference signal. When a second detector detects the number signal, an internal delay circuit gives the detected reference signal an internal delay which depends on the number signal and produces a delayed reference signal. Responsive to the delayed reference signal, a multiplexer processes a first upward signal from the succeeding station into a processed signal. A second delay circuit gives the processed signal the fixed and produces a second upward signal to be received by the preceding station with the propagation delay. The repeater station may also be used as a terminal station.

8 Claims, 5 Drawing Sheets

SUBSIDIARY STATION CAPABLE OF AUTOMATICALLY ADJUSTING AN INTERNAL DELAY IN RESPONSE TO A NUMBER SIGNAL RECEIVED IN A DOWNWARD SIGNAL BY THE SUBSIDIARY STATION

BACKGROUND OF THE INVENTION

This invention relates to a subsidiary station for use in a time division multiple access network.

Such a time division multiple access network comprises a central or base station, a terminal station remote from the central station, and at least one repeater station placed between the central station and the terminal station. For convenience of description, each of the terminal and the repeater stations is called a subsidiary station.

When initially set or newly installed in the network, a conventional subsidiary station must be given an internal delay so that a total delay given by adding the internal delay to twice a propagation delay from a next preceding station of the network to the subsidiary station should be equal to a frame period of a downward signal received from the central station as will later be described. When the subsidiary station receives the downward signal from the central station, the subsidiary station transmits an upward signal towards the central station. When at least one preceding repeater station is placed between the central station and the subsidiary station, the upward signal reaches the central station a lapse of a time duration, given by multiplying the frame period by the number of the preceding repeater station, after transmission of the downward signal from the central station. Thus, a long time is wasted until reception of the upward signal at the central station after transmission of the downward signal from the central station.

A repeater station is disclosed in U.S. Pat. No. 4,490,818 issued to Shigeru Otsuka and assigned to NEC Corporation. The repeater station is also disclosed in Canadian Patent No. 1,191,205 and in Australian Patent No. 553,157. The repeater station may have a predetermined initial delay shorter than the frame period. It is therefore possible to shorten the time duration between transmission of the downward signal from the central station and reception of the upward signal at the central station. However, the repeater station is incapable of automatically deciding the internal delay.

SUMMARY OF THE INVENTION

It is an object of this invention to provide a subsidiary station capable of automatically deciding an internal delay in response to a particular signal included in a downward signal.

Other objects of this invention will become clear as the description proceeds.

A repeater station to which this invention is applicable is for receiving a first downward signal from a next preceding station with a propagation delay, for transmitting a second downward signal to a next succeeding station, for receiving a first upward signal from the succeeding station, and for transmitting to the preceding station a second upward signal which should be received by the preceding station with the propagation delay. Each of the first and the second downward signals has a frame period and includes a reference signal. Each of the first and the second upward signals has said frame period. The repeater station includes a first delay circuit for giving a fixed delay to the first downward signal, and a first detector for detecting the reference signal of the first downward signal to produce a first detection signal. According to an aspect of this invention, the fixed delay is rendered equal to an integral submultiple of said frame period minus said propagation delay. The first downward signal includes a number signal representative of an integer corresponding in number to at least one other station through which the first downward signal is received from an originating station. The at least one other station comprises the preceding station. The repeater station comprises: a second detector for detecting the number signal to produce a second detection signal representative of the integer; an internal delay circuit responsive to the second detection signal for giving an internal delay to the first detection signal to produce a delayed detection signal, the internal delay being decided in consideration of the integer; processing means responsive to the delayed detection signal for processing the first upward signal into a processed signal; and a second delay circuit for giving the fixed delay to the processed signal to produce the second upward signal.

A terminal station to which this invention is applicable is for receiving a downward signal from a next preceding station with a propagation delay and for transmitting to the preceding station an upward signal which should be received by the preceding station with the propagation delay. The downward signal has a frame period and includes a reference signal. The upward signal has the frame period. The terminal station includes a first delay circuit for giving a fixed delay to the downward signal to produce a delayed signal, and a first detector for detecting the reference signal to produce a first detection signal. According to another aspect of this invention, the fixed delay is rendered equal to an integral submultiple of the frame period minus said propagation delay. The downward signal includes a number signal representative of an integer corresponding in number to at least one repeater station through which the downward signal is received from an originating station. The terminal station comprises: a second detector for detecting the number signal to produce a second detection signal representative of the integer; an internal delay circuit responsive to the second detection signal for giving an internal delay to the first detection signal to produce a delayed detection signal, the internal delay being decided in consideration of the integer; processing means responsive to the delayed detection signal for processing an input signal into a processed signal; and a second delay circuit for giving the fixed delay to the processed signal to produce the upward signal.

DESCRIPTION OF THE PREFERRED EMBODIMENT

Figure 1:
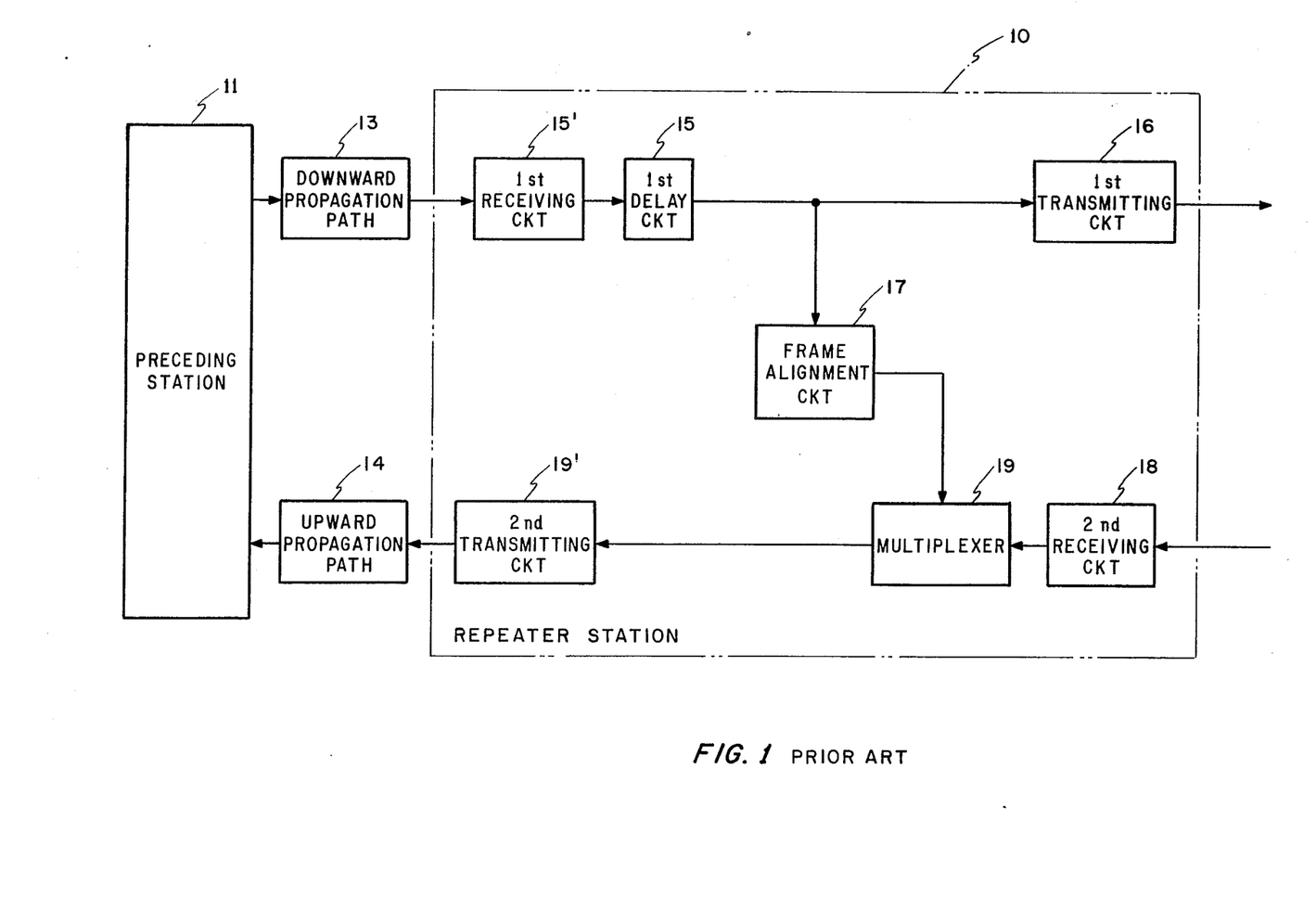
FIG. 1 shows a block diagram of a conventional repeater station together with a preceding station.

Referring to FIG. 1, a conventional repeater station 10 will be described at first for a better understanding of this invention. The repeater station 10 is for receiving a first downward signal from a next preceding station 11 with a downward propagation delay defined by a downward propagation path 13 and for transmitting a second downward signal to a succeeding station (later illustrated). The repeater station 10 is also for receiving a first upward signal from the succeeding station and for transmitting to the preceding station 11 a second upward signal which should be received by the preceding station 11 with an upward propagation delay defined by an upward propagation path 14. The upward propagation delay is substantially equal to the downward propagation delay.

The preceding station 11 may be either a central station or another repeater station. The succeeding station may be either a terminal station or another repeater station.

Each of the first and the second downward and upward signals has a frame period. Each of the first and the second downward signals includes a frame alignment signal as a reference signal. It will be assumed throughout the following that each frame consists of N bits, where N represents a prescribed natural number.

The repeater station 10 includes a delay circuit 15 for giving a fixed delay to the first downward signal through a first receiving circuit 15' to produce a delayed signal. The fixed delay is rendered equal to a difference between one frame period and a sum of the upward and the downward propagation delays. A first transmitting circuit 16 transmits the delayed signal to the succeeding station as the second downward signal.

Responsive to the delayed signal, a frame alignment circuit 17 reproduces the frame alignment signal, namely, the reference signal. That is, the frame alignment circuit 17 is operable as a first detector for detecting the reference signal of the first downward signal to produce a first detection signal.

A second receiving circuit 18 receives the first upward signal. A multiplexer 19 processes the first upward signal into a processed signal in accordance with the first detection signal. The processed signal is transmitted to the preceding station 11 through a second transmitting circuit 19' and the upward propagation path 14 as the second upward signal.

A terminal station need not comprise the first transmitting and the second receiving circuits 16 and 18.

Figure 2:
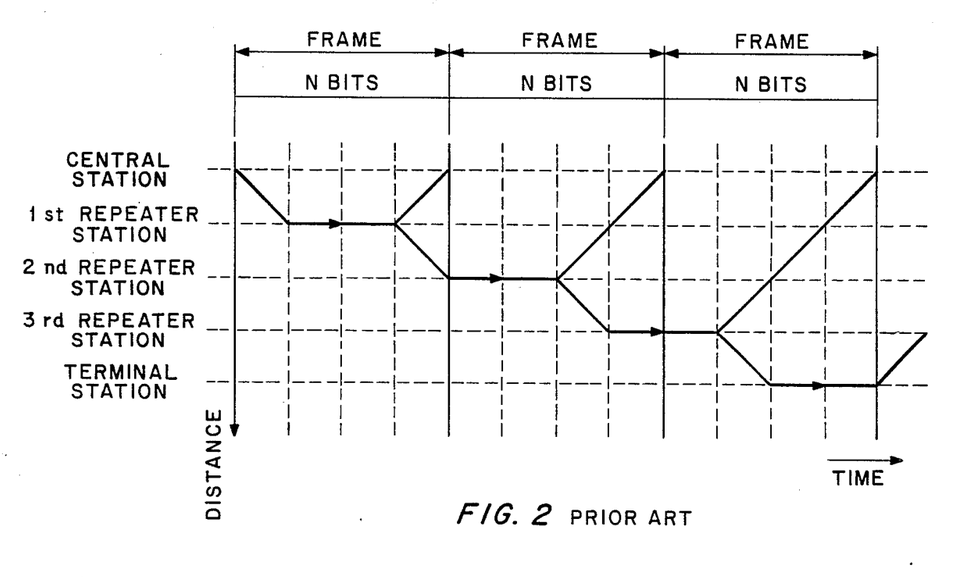
FIG. 2 is a time chart for use in describing operation of the conventional repeater station illustrated in FIG. 1.

Referring to FIG. 2 together with FIG. 1, a description will be made as regards operation of the repeater station 10. It will be assumed that first, second, and third repeater stations are placed between a central station and a terminal station. Each of the first, the second and the third stations is similar in structure to the repeater station 10. In FIG. 2, the abscissa represents time while the ordinate represents a distance from the central station.

The central station transmits a first downward signal to the first repeater station. The first repeater station receives the first downward signal with the downward propagation delay. Merely for convenience of description, the downward propagation delay will be assumed to be equal to ¼ of the frame period.

In the first repeater station, the delay circuit 15 has a fixed delay which is rendered equal to 2/4 of the frame period. Therefore, the delay circuit 15 produces the delayed signal ¾ frame period after transmission of the first downward signal from the central station.

The frame alignment circuit 17 of the first repeater station extracts the frame alignment signal from the delayed signal. In accordance with the frame alignment signal, the multiplexer 19 of the first repeater station processes a first upward signal into a processed signal for use as a second upward signal in the manner described above. The second upward signal is transmitted to the central station through the upward propagation path 14 which has the upward propagation delay. Inasmuch as the downward delay is assumed to be ¼ frame period, the upward propagation delay is also equal to ¼ of the frame period. Thus, the central station receives the second upward signal a lapse of one frame period after the first downward signal is sent by the central station.

The first transmitting circuit 16 of the first repeater station transmits the delayed signal as a second downward signal to the second repeater station through another downward propagation path which is between the first and the second repeater stations. The downward propagation path will be assumed to be equal to ¼ of the frame period like the downward propagation path between the central and the first repeater stations. Thus, the second downward signal is received by the second repeater station a lapse of one frame period after the first downward signal is sent by the central station.

After reception of the second downward signal, the second repeater station transmits another upward signal to the first repeater station in the manner similar to the first repeater station. This upward signal is immediately repeated by the first repeater station to the central station. As a result, the central station receives the upward signal from the second repeater station a lapse of two frame periods after the first downward signal is sent by the central station.

In this manner, the central station receives an upward signal from the third repeater station a lapse of three frame periods after the central station sends the first downward signal. As for an upward signal of the terminal station, a long time duration of four frame periods is necessary, until reception of the upward signal after transmission of the downward signal of the central station. It is now understood that the internal delay of the repeater station results in an objectional delay in reception of an upward signal of a remote station at the central station.

Figure 3:
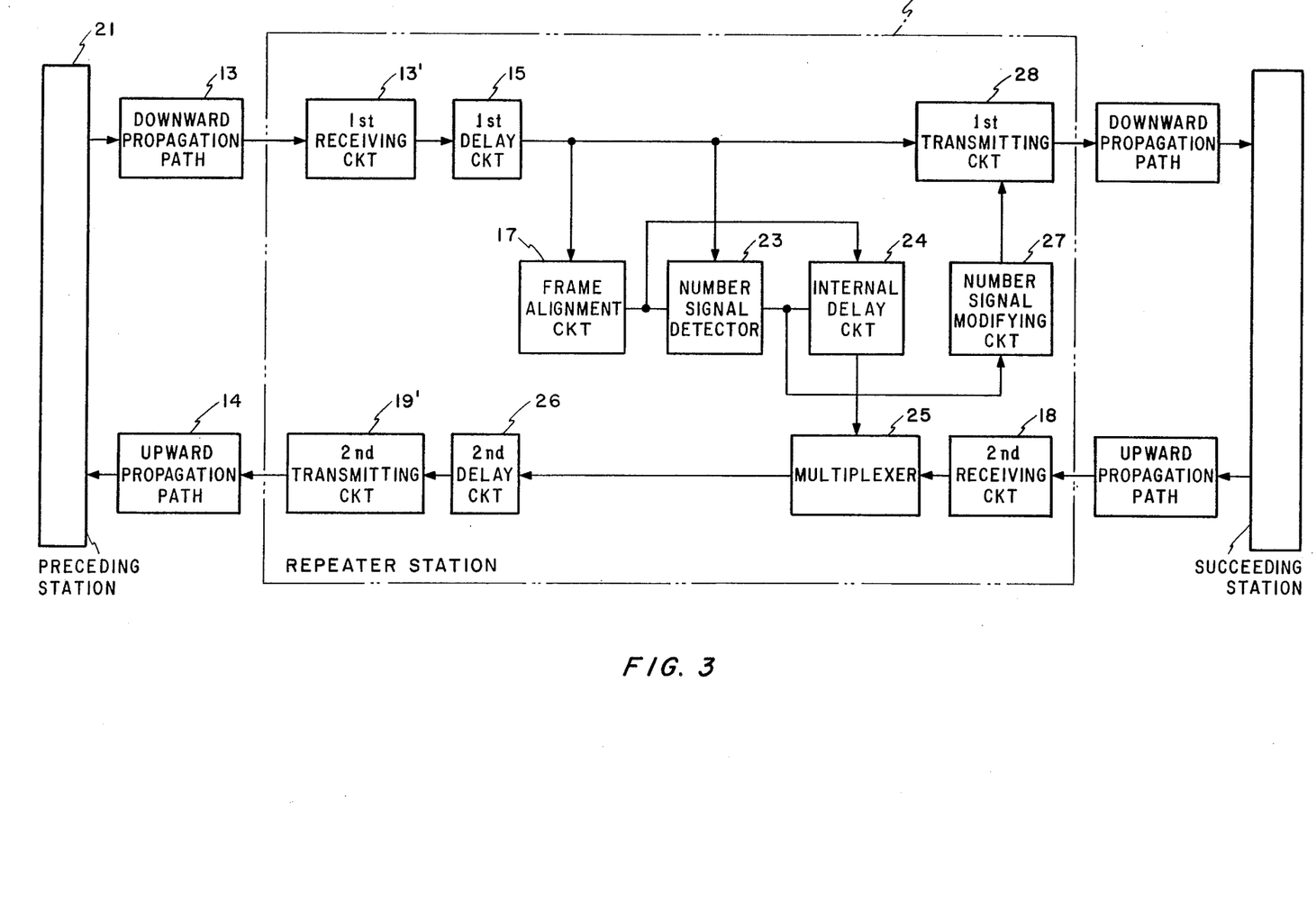
FIG. 3 shows a block diagram of a repeater station according to a preferred embodiment of this invention together with a preceding and a succeeding station.

Referring to FIG. 3, a repeater station 20 according to a preferred embodiment of this invention comprises similar parts designated by like reference numerals. The repeater station 20 is for use in combination with upward and downward propagation paths 13 and 14 for connecting the repeater station 20 to a predetermined number of preceding stations and to at least one succeeding station. One of the preceding stations that immediately precedes the repeater station 20, corresponds to a preceding station designated by a reference number 21 in FIG. 3. The repeater station 20 is for receiving a first downward signal from the preceding station 21 with a down propagation delay defined by the downward propagation path 13 and for transmitting a second downward signal to the succeeding station. The repeater station 20 is also for receiving a first upward signal from the succeeding station and for transmitting to the preceding station 21 a second upward signal which should be received by the preceding station 21 with an upward propagation delay defined by the upward propagation path 14.

The preceding station 21 may be either a central or originating station or another repeater station. The succeeding station may be either a terminal station or another repeater station.

Figure 4:
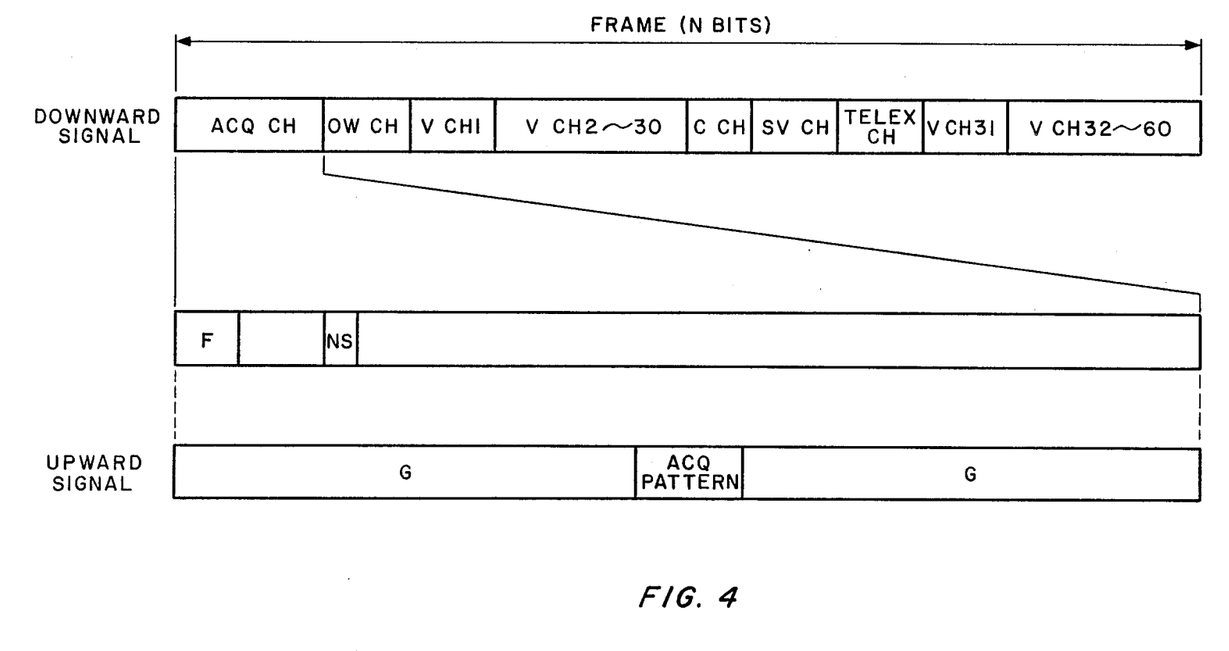
FIG. 4 shows formats for downward and upward signals received by the repeater station illustrated in FIG. 3.

Turning to FIG. 4, the first downward signal has a frame period depicted along a top line. As depicted along a second line from the top, the first downward signal includes a frame alignment signal labeled "F" and a number signal labeled "NS" representative of an integer for the repeater station 22 (FIG. 3) which should receive the first downward signal in question. The integer for the repeater station 22 is equal to the predetermine number in a manner which will become clear as the description proceed. The frame alignment signal and the number signal are included in an initial acquision channel labeled "ACQ CH". The frame alignment signal is used as the reference signal. The number signal is called a particular signal hereinabove and is for use in deciding an internal delay of each subsidiary station in the manner which will later be described. In the manner known in the art, the first downward signal further includes an order wire channel labeled "OW CH", a predetermined number of voice channels each of which is labeled "V CH", a control channel labeled "C CH", a supervisory channel labeled "SV CH", and a teleprinter exchange channel labeled "TELEX CH".

As depicted along a bottom line, the upward signal comprises an initial acquision pattern labeled "ACQ PATTERN" in the initial acquision channel "ACQ CH". In the manner known in the art, the acquision pattern is interposed between two guard time portions each labeled "G".

Turning back to FIG. 3, the repeater station 20 comprises a first delay circuit 15 for giving a fixed delay to the first downward signal through the first receiving circuit 13' to produce a delayed signal as described in conjunction with FIG. 1. It is, however, to be noted that the fixed delay is rendered equal to an integral submultiple 1/M of the frame period minus the propagation delay of the downward propagation path 13, where M represents a preselected natural number.

The frame alignment circuit 17 serves as a first detector for detecting the frame alignment or reference signal of the first downward signal to produce a first detection signal as described in conjunction with FIG. 1. In the example being illustrated, the frame alignment circuit 17 receives the delayed signal from the first delay circuit 15.

A number signal detector 23 is operable as a second detector for detecting the number signal in the delayed signal with reference to the first detection signal to produce a second detection signal representative of the integer. In this manner, the number signal detector 23 detects the number signal in the first downward signal to produce the second detection signal.

Responsive to the second detection signal, an internal delay circuit 24 gives an internal delay to the first detection signal to produce a delayed detection signal. The internal delay is automatically decided in consideration of the integer by a read-only memory.

When the repeater station 20 is operable also as a terminal station, a multiplexer 25 is used for connection to a signal transmission line (not shown) for local signals. The multiplexer 25 is for multiplexing the local signals and the first upward signal received through the second receiving circuit 18 into a multiplexed signal. The first upward signal includes a control signal for supervision in the manner known in the art. The multiplexer 25 is operable as a processing circuit responsive to the delayed detection signal for processing the multiplexed signal into a processed signal. When attention is directed to the first upward signal, it is possible to understand that the multiplexer 25 processes the first upward signal into the processed signal.

A second delay circuit 26 is for giving the fixed delay to the processed signal to produce the second upward signal which is transmitted to the preceding station 21 through the second transmitting circuit 19' and the upward propagation path 14. The fixed delay is rendered equal to an integral submultiple 1/M of the frame period minus the propagation delay of the upward propagation path 14.

A number signal modifying circuit 27 is operable as a first modifying circuit for modifying the number signal into a modified signal representative of another integer for the succeeding station. Typically, the modified signal is representative of one plus the integer.

A first transmitting circuit 28 serves as a second modifying circuit responsive to the modified signal for modifying the delayed signal into a second downward signal with the modified signal substituted for the number signal included in the delayed signal. When the repeater station 20 is used also as the terminal station in the manner described above, the first transmitting circuit 28 serves at least partly as a demultiplexer.

In a terminal station, the first transmitting and the second receiving circuits 28 and 18 and the number signal modifying circuit 27 are unnecessary. The multiplexer 25 is used in multiplexing only local signals which may collectively called an input signal. The multiplexer 25 serves as a processing circuit responsive to the delayed signal for processing the input signal into a processed signal.

Figure 5:
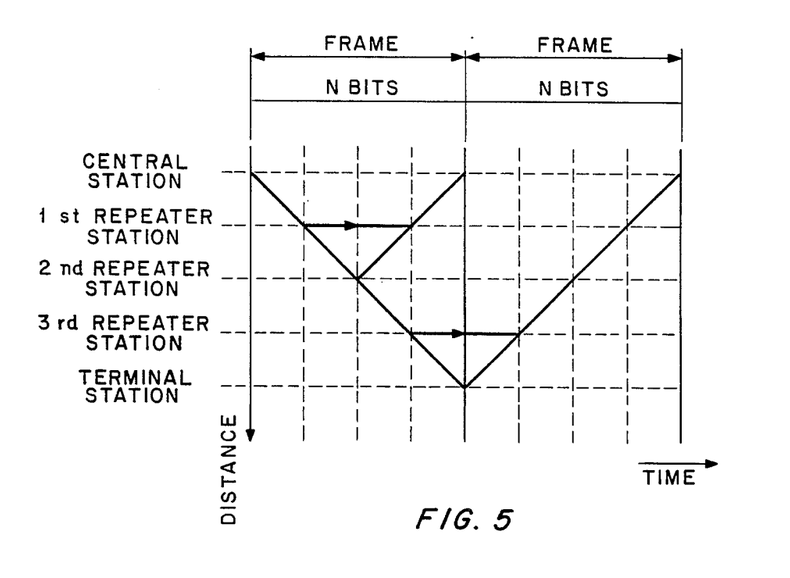
FIG. 5 is a time chart for use in describing operation of the repeater station illustrated in FIG. 3.

Referring to FIG. 5 together with FIG. 3, description will proceed to operation of the repeater station 20 and the terminal station. It will be assumed that first, second and third repeater stations are placed between a central station and the terminal station. Each of the first the second and the third stations is similar to the repeater station 20.

The central station transmits to the first repeater station a first downward signal including a frame alignment or reference signal and a number signal. The number signal may represent unity. The first downward signal reaches the first repeater station with a downward propagation delay of a downward propagation path between the central and the first repeater stations. The first delay circuit 15 produces the delayed signal by giving a fixed delay to the first downward signal. The fixed delay is preliminarily decided so that the delayed signal be produced with a total difference of ¼ of the frame period relative to transmission of the first downward signal from the central station. For this purpose, the fixed delay is rendered equal to an integral submultiple ¼ of the frame period minus the downward propagation delay.

Responsive to the number signal representative of unity, the internal delay circuit 24 automatically adjusts the internal delay to ½ of the frame period. The internal delay circuit 24 gives the internal delay to the first detection signal received from the frame alignment circuit 17 and produces the delayed detection signal ¾ frame period after transmission of the first downward signal at the central station.

Responsive to the delayed detection signal, the multiplexer 25 processes the first upward signal into the processed signal. The delayed detection signal is used in making the multiplexer 25 begin to produce the processed signal concurrently with the delayed detection signal.

A fixed delay of the second delay circuit 26 is rendered equal to an integral submultiple ¼ of the frame period minus an upward propagation delay of the upward propagation path 14. Inasmuch as the upward propagation delay is substantially equal to the downward propagation delay, the fixed delay of the second delay circuit 26 is substantially equal to the fixed delay of the first delay circuit 15. The second delay circuit 26 gives the fixed delay to the processed signal. As a result, the central station receives the second upward signal a lapse of one frame period after the first downward signal is sent by the central station.

Meanwhile the first detection signal is subjected to the internal delay in the internal delay circuit 24, the number signal modifying circuit 27 modifies the number signal received from the number signal detector 23 into a modified signal representative of another integer for the second station. This integer may be equal to two. In the second downward signal, the modified signal is substituted for the number signal included in the delayed signal. The first transmitting circuit 28 sends the second downward signal including the modified signal to a downward propagation path between the first and the second repeater stations.

This downward signal reaches the second repeater station with a downward propagation delay of the downward propagation path. The downward signal therefore reaches the second repeater station, after transmission of the downward signal at the central station, with a delay which is equal to a sum of the downward propagation delays of the propagation paths between the central and the first repeater stations and between the first and the second repeater stations.

In the second repeater station, the first delay circuit 15 gives a fixed delay to the downward signal. The fixed delay is preliminarily decided so as to be equal to ¼ of the frame period minus the propagation delay between the first and the second repeater stations. As a result, the second repeater station receives the downward signal a lapse of ½ of the frame period after the downward signal is sent by the central station.

Responsive to the modified signal representative of two, the internal delay circuit 24 of the second repeater station gives an internal delay to the first detection signal received from the frame alignment circuit 17. The internal delay is now equal to zero. Therefore, the second repeater station produces the processed signal with a delay of ½ frame period relative to transmission of the downward signal at the central station.

The second repeater station sends the upward signal to the first repeater station with a total delay of ¾ frame period after the downward signal is sent by the central station. Thus, the central station receives the upward signal from the second repeater station a lapse of one frame period after the downward signal is sent by the central station.

Likewise, the third repeater and the terminal stations receive the number signals representative of three and four, respectively. Responsive to the number signal representative of three, the internal delay circuit 24 of the third repeater station gives an internal delay of ½ frame period to the first detection signal received from the frame alignment circuit 17. Responsive to the number signal representative of four, the internal delay circuit 24 of the terminal station gives an internal delay of zero to a first detection signal.

As a result, the central station receives the upward signals from the third repeater and the terminal stations a lapse of two frame periods after the central station sends the downward signal.

Thus, the central station receives the upward signal from the terminal stations with only a short delay after transmission of the downward signal at the central station. Each of the first through the third repeater stations and the terminal station automatically decides the internal delay in response to the number signal included in the downward signal.

Figure 6:
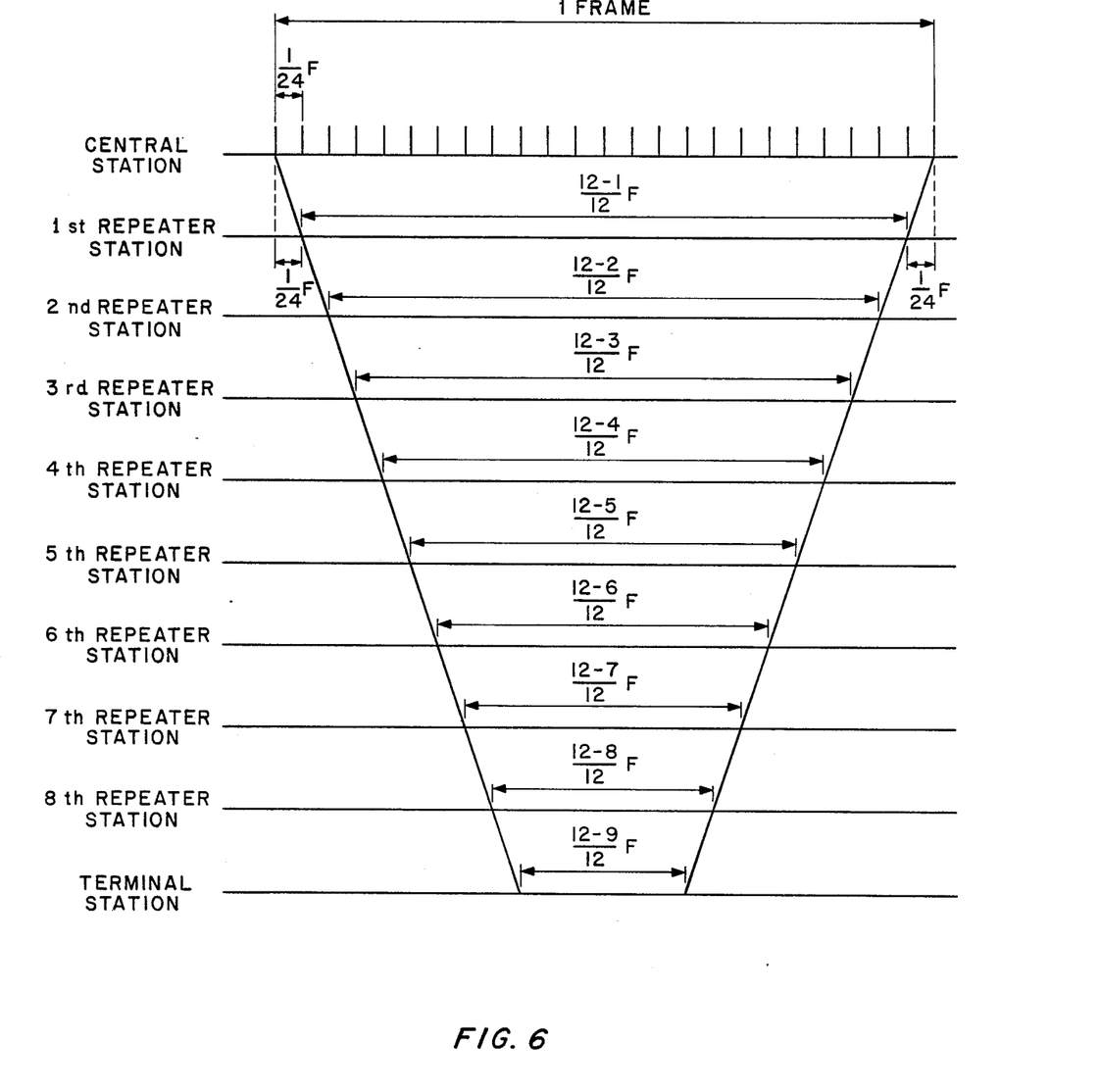
FIG. 6 is another time chart for use in describing modified operation of the repeater station illustrated in FIG. 3.

Referring to FIG. 6, description will now be made as regards modified operation of the repeater station 20 (FIG. 3) and the terminal station. In this case, first through eighth repeater stations are placed between central and terminal stations. For each of the repeater and the terminal stations, a total delay of a downward path 13 (FIG. 3) and a first delay circuit 15 (FIG. 3) is rendered equal to 1/24 of a frame period. Another total delay of an upward path 14 (FIG. 3) and a second delay circuit 26 (FIG. 3) is also rendered equal to 1/24 of the frame period for each of the repeater and the terminal stations. In each of the repeater and the terminal stations, an internal delay circuit 24 (FIG. 3) gives a first detection signal an internal delay equal to (12−n)/12 of the frame period, where n represents an integer represented by a number signal received by the internal delay circuit. In the example being illustrated, the central station can receive all of upward signals transmitted from all of the repeater and the terminal stations a lapse of one frame period after the central station sends a downward signal towards the first repeater station.

What is claimed is:

1. In a repeater station for use in combination with an upward and a downward propagation path for connecting said repeater station to a predetermined number of preceding stations and to at least one succeeding station, said repeater station (a) receiving a first downward signal with a propagation delay from one of said preceding stations that immediately precedes said repeater station, (b) transmitting a second downward signal to said succeeding station, (c) receiving a first upward signal from said succeeding station, and (d) transmitting a second upward signal which should be received with said propagation delay at said one of the preceding stations, each of said first and said second downward signals having a frame period and including a reference signal, each of said first and said second upward signals having said frame period, said repeater station including a first delay circuit for giving a fixed delay to said first downward signal to produce a delayed signal for use as said second downward signal, and a first detector for detecting the reference signal of said first downward signal to produce a first detection signal, the improvement wherein:

said fixed delay is rendered equal to an integral submultiple of said frame period minus said propagation delay;

said first downward signal including a number signal which is representative of said predetermined number;

said repeater station comprising:

a second detector for detecting said number signal to produce a second detection signal which is representative of said predetermined number;

an internal delay circuit responsive to said second detection signal for giving an internal delay to said first detection signal to produce a delayed detection signal, said internal delay being decided in consideration of said predetermined number;

processing means responsive to said delayed detection signal for processing said first upward signal into a processed signal; and a second delay circuit for giving said fixed delay to said processed signal to produce said second upward signal.

2. A repeater station as claimed in claim 1, further comprising:

first modifying means for modifying said number signal into a modified signal representative of an integer for said succeeding station; and second modifying means responsive to said modified signal for modifying said delayed signal into said second downward signal with said modified signal substituted for the number signal included in said delayed signal.

3. In a terminal station for use in combination with an upward and a downward propagation path for connecting said terminal station to a predetermined number of preceding stations, said terminal station receiving a downward signal with a propagation delay from one of said preceding stations that immediately precedes said terminal station and transmitting an upward signal which should be received with said propagation delay at said one of the preceding stations, said downward signal having a frame period and including a reference signal, said upward signal having said frame period, said terminal station including a first delay circuit for giving a fixed delay to said downward signal to produce a delayed signal, and a first detector for detecting said reference signal to produce a first detecting signal, the improvement wherein:

said fixed delay is rendered equal to an integral submultiple of said frame period minus said propagation delay;

said downward signal including a number signal which is representative of said predetermined number;

said terminal station comprising:

a second detector for detecting said number signal to produce a second detection signal which is representative of said predetermined number;

an internal delay circuit responsive to said second detection signal for giving an internal delay to said first detection signal in order to produce a delayed detection signal, said internal delay being decided in consideration of said predetermined number;

a second delay circuit for giving said fixed delay to a processed signal in order to produce said upward signal; and processing means responsive to said delayed detection signal for processing an input signal into said processed signal into said processed signal.

4. In a repeater station for use in combination with an upward and a downward propagation path for connecting said repeater station to an originating station and to at least one succeeding station for signal propagation; said repeater station receiving a first downward signal from said originating station with a propagation delay, transmitting a second downward signal to said succeeding station, receiving a first upward signal from said succeeding station, and transmitting a second upward signal to be received at said originating station with said propagation delay; each of said first and said second downward and said first and said second upward signals having a frame period, each of said first and said second downward signals including a reference signal; said repeater station including a first delay circuit for giving a fixed delay to said first downward signal to produce a delayed signal for use as said second downward signal, and a first detector for detecting the reference signal of said first downward signal to produce a first detection signal; the improvement wherein:

said fixed delay is rendered equal to an integral submultiple of said frame period minus said propagation delay;

said first downward signal including a number signal which is representative of unity;

said repeater station comprising:

a second detector for detecting said number signal to produce a second detection signal which is representative of unity;

an internal delay circuit responsive to said second detection signal for giving an internal delay to said first detection signal in order to produce a delayed detection signal, said internal delay being decided depending on an integer which is equal to unity;

processing means responsive to said delayed detection signal for processing said first upward signal into a processed signal; and a second delay circuit for giving said fixed delay to said processed signal to produce said second upward signal.

5. A repeater station as claimed in claim 4, further comprising:

first modifying means for modifying said number signal into a modified signal which is representative of two for said succeeding station; and second modifying means responsive to said modified signal for modifying said delayed signal into said second downward signal with said modified signal being substituted for the number signal included in said delayed signal.

6. In a time division telephone system having a two-way transmission channel which may extend through a number of stations at least one of which is a particular repeater station, said channel carrying signals divided into cyclicly recurring time frame periods which experience propagation delays while in transmission to and through said stations whereby signals in any given time frame period experiences a propagation delay which may vary at different ones of stations through which said channel passes, each of said signals in any time frame period including a number signal that identifies the particular repeater station whereby said number signal indicates a propagation delay which said signals have experienced before they reach said particular repeater station, said particular repeater station comprising:

delay means responsive to said number signal in an incoming time frame signal which is being transmitted in one direction on said two-way channel for introducing a fixed delay to said time frame period, said fixed delay being a period equal to an integral submultiple of said time frame period minus the total propagation delay, means for retransmitting said incoming time frame signal with said introduced fixed delay, said retransmission being sent out from said particular repeater station in said one direction over said two-way channel, means also responsive to said number signal for adding said fixed delay to other incoming time frame signals which are being transmitted in an opposite direction over said two-way channel to and received by said particular repeater station, and means for retransmitting said other incoming time frame signals with said fixed delay, said retransmitted other incoming time frame signals being sent out from said particular repeater station in said opposite direction over said two-way channel whereby said received incoming time frame signals are transmitted in said opposite direction in time alignment with the time frame signal that is incoming in said one direction in response to said number signal.

7. The system of claim 6 and means in said particular repeater station for modifying said signal number to represent another of said stations in said channel, said other station being coupled to receive signals transmitted in said one direction by said particular repeater stations and to transmit signals in said opposite directions to said particular repeater station, means responsive to said modified number for changing both said fixed delay and the number signal in the time frame signal; and means for retransmitting said signal with said modified number and changed delay to said other station in said one direction.

8. In a time division telephone system having a two-way transmission channel which may extend through a number of stations at least one of which is a particular terminal station said channel carrying signals divided into cyclicly recurring time frame periods which experience propagation delays while in transmission to and through each of said stations whereby signals in any given time frame period experiences a propagation delay which may be different at each of said stations through which said channel passes, each of said signals in any time frame period including a number signal, said number signal identifying one of the stations through which incoming signals in said frame periods have passed before they reach said particular station said particular terminal station comprising:

fixed delay means for introducing a fixed delay to said time frame period, said fixed delay being a period equal to an integral submultiple of said time frame period minus the total propagation delay, detector means for detecting said number signal in a time frame signal which is incoming to said terminal station in one direction on said two-way channel, means responsive to said detector means for adding said fixed delay to outgoing time frame signals which are transmitted from said terminal in an opposite direction over said two-way channel, and processing means responsive to said detector means for processing said incoming time frame signal.

* * * * *